United States Patent [19]
Coggio et al.

[11] Patent Number: 6,080,487
[45] Date of Patent: Jun. 27, 2000

[54] METHOD OF IMPROVING ADHESION BETWEEN A FLUOROPOLYMER AND A SUBSTRATE

[75] Inventors: William D. Coggio, Woodbury; Timothy M. Dietz, St. Paul; Daniel R. Fronek, Woodbury, all of Minn.; Tatsuo Fukushi, Tokyo, Japan; Constance J. Nelson, Woodbury, Minn.; Douglas S. Parker, Afton, Minn.; Trang D. Pham, Bloomington, Minn.; Keizo Yamanaka, Maplewood, Minn.

[73] Assignee: 3M Innovative Properties Company, St. Paul, Minn.

[21] Appl. No.: 08/703,810

[22] Filed: Aug. 26, 1996

[51] Int. Cl.[7] .......................... B32B 27/08; B32B 27/16; B32B 27/32; B32B 31/30
[52] U.S. Cl. ...................... 428/422; 428/421; 428/423.1; 428/473.5; 428/476.3; 428/515; 428/520; 156/244.11; 156/244.23; 156/297; 427/299; 427/301; 427/302; 427/322
[58] Field of Search .................. 156/244.11, 244.23, 156/297; 427/299, 307, 322, 301, 302; 428/421, 422, 476.3, 423.1, 473.5, 515, 520

[56] References Cited

U.S. PATENT DOCUMENTS

| | | | |
|---|---|---|---|
| 3,274,089 | 9/1966 | Wolinski | 204/165 |
| 3,507,844 | 4/1970 | Wood | 260/87.7 |
| 3,592,714 | 7/1971 | Katz | 156/329 |
| 4,230,768 | 10/1980 | Hamada et al. | 428/352 |
| 4,335,238 | 6/1982 | Moore et al. | 526/254 |
| 4,643,953 | 2/1987 | Gurgiolo et al. | 428/520 |
| 4,718,618 | 1/1988 | Ichizuka | 242/195 |
| 4,740,562 | 4/1988 | Menke et al. | 525/366 |
| 4,742,126 | 5/1988 | Moggi et al. | 525/340 |
| 4,758,618 | 7/1988 | Ito et al. | 524/430 |
| 4,882,390 | 11/1989 | Grootaert et al. | 525/326.3 |
| 5,106,673 | 4/1992 | Effcenberger et al. | 428/216 |
| 5,167,259 | 12/1992 | Brunnhofer | 138/137 |
| 5,262,490 | 11/1993 | Kolb et al. | 525/343 |
| 5,284,184 | 2/1994 | Noone et al. | 138/121 |

FOREIGN PATENT DOCUMENTS

| | | |
|---|---|---|
| 0 132 583 | 2/1985 | European Pat. Off. . |
| 0 185 590 | 6/1986 | European Pat. Off. . |
| 0 332 438 | 9/1989 | European Pat. Off. . |
| 61-007337 | 1/1986 | Japan . |

OTHER PUBLICATIONS

Cirillo et al., "Fluoroelastomers: Reaction Products in Early Stages of Network Formation," Biological and Synthetic Polymer Networks, 255–265 (1988).

Souheng Wu, "Modifications of Polymer Surfaces," Polymer Interface and Adhesion, pp. 280–283 and 298–299.

W.P. Weber & G.W. Gokel, Reactivity and Structure, Concepts in Chemistry vol. 4, "Phase Transfer Catalysts in Organic Synthesis" pp. 1–17 (1977).

Brewis et al., "Pretreatment of poly(vinyl fluoride) and poly(vinylidene fluoride) with potassium hydroxide," Int. J. Adhesion and Adhesives, vol. 16, No. 2, pp. 87–95 (1996).

*Primary Examiner*—Vivian Chen
*Attorney, Agent, or Firm*—Daniel C. Schulte

[57] ABSTRACT

A multi-layer article comprising a substrate and a dehydrofluorinated fluoropolymer, wherein the dehydrofluorinated polymer contains substantially no grafted adhesion-promoting groups, and the dehydrofluorinated fluoropolymer contains sufficient carbon-carbon unsaturation to increase the adhesion between the dehydrofluorinated fluoropolymer and the substrate.

33 Claims, No Drawings

METHOD OF IMPROVING ADHESION BETWEEN A FLUOROPOLYMER AND A SUBSTRATE

FIELD OF THE INVENTION

The invention relates to a method of improving the adhesion between a fluoropolymer and a hydrocarbon substrate. The method includes the step of dehydrofluorinating the fluoropolymer.

BACKGROUND OF THE INVENTION

Fluorine-containing polymers, or fluoropolymers, including fluoroelastomers and fluoroplastics, are an important class of commercial materials. Fluoropolymers are known to exhibit chemical inertness (resistance to chemical attack), high thermal stability, usefulness at high temperatures, and toughness and flexibility at very low temperatures.

Useful fluoropolymers include fluoroelastomers and fluoroplastics. Usefull fluoroelastomers can contain interpolymerized units derived from olefinically unsaturated monomers, such as monomers of vinylidene fluoride, hexafluoropropylene, tetrafluoroethylene, etc. These fluoroelastomers have particular utility in high temperature applications, such as seal gaskets and linings. Fluoroplastics, particularly those containing interpolymerized monomeric units derived from chlorotrifluoroethylene, tetrafluoroethylene, hexafluoropropylene, and vinylidene fluoride, have numerous electrical, mechanical, and chemical applications. As an example, these fluoroplastics are useful in wire, electrical components, seals, solid and lined pipes, and pyroelectric detectors.

Because fluoropolymers are often expensive, these materials are often used in the form of a composite, multi-layer structure which reduces the amount of fluoropolymer required to produce the structure. In the manufacture of these composite structures, may be required that the fluoropolymer be bonded to one or more hydrocarbon-based substrate that may or may not be fluorinated. Thus, the fluorinated and the hydrocarbon layers are combined, taking advantage of the useful properties of each type of material; i.e., the fluorinated layer can be a thin, flexible layer of material which provides resistance to chemical attack and/or vapor barrier properties, while the hydrocarbon substrate layer can provide desired strength and/or flexibility, and substantial cost reduction.

A variety of methods have been used to increase the bond strength between a fluorinated polymer layer and a hydrocarbon substrate layer such as a polyamide or polyolefin layer. For example, an adhesive layer can be added between the two layers. A shortcoming of adding an adhesive layer is that this increases the complication of the manufacturing process, due to the added step of applying the adhesive. Alternatively, one or both of the fluorinated or hydrocarbon layers can be exposed to various surface treatments; i.e., corona, flame, or plasma discharge treatment. A shortcoming of these types of surface treatment is that they can often be temporary and over time delamination of the product may occur during use.

Adhesive bond strength between a fluoropolymer and a hydrocarbon substrate can also be increased by chemical modification of the fluoropolymer or the hydrocarbon substrate; i.e., the addition of adhesion-promoting grafted substituents to one or more of the fluoropolymer or hydrocarbon substrate. For instance, in the case of the fluoropolymer, it can be reacted with an amine, a hydroxyl group, a free radical graft, etc., to produce a fluoropolymer comprising a grafted substituent that is reactive with the hydrocarbon substrate. Although such adhesion-increasing substituents can in fact result in improved adhesion between the fluoropolymer and a hydrocarbon substrate, the grafted substituents (on either the fluoropolymer or the hydrocarbon substrate) can also have undesired effects on the physical properties of the fluoropolymer or hydrocarbon substrate. By modifying the fluoropolymer, for example, with the addition of adhesion-promoting groups, the concentration of fluorine atoms on the fluoropolymer is reduced. As a result the chemical inertness of the fluoropolymer, and its ability to resist chemical attack, may be negatively affected. Additionally, important physical and/or mechanical properties of a fluoropolymer or of a hydrocarbon substrate, including melting point, glass transition temperature, and/or solubility, might be affected by the addition of adhesion-promoting groups. These changes in the chemical inertness and/or physical and mechanical properties can negatively and significantly affect the end properties of articles prepared from these modified fluoropolymers and/or hydrocarbon substrates, and are preferably avoided. Thus it would be useful to provide a method of creating or enhancing an adhesive bond between a fluoropolymer and a hydrocarbon substrate, without the addition of grafted, adhesion-promoting groups to the fluoropolymer or the hydrocarbon substrate.

SUMMARY OF THE INVENTION

The present invention provides a method of creating or increasing bond strength between a fluoropolymer and a hydrocarbon substrate. The method provides adhesion between a fluoropolymer and a hydrocarbon substrate based on the introduction of carbon-carbon unsaturation into the fluoropolymer backbone; no further chemical modification is required. The method does not require the addition of grafted adhesion-promoting substituents onto the fluoropolymer, which can negatively effect the physical and mechanical properties of the fluoropolymer.

An aspect of the present invention relates to a method of increasing the bond strength between a fluoropolymer and a hydrocarbon substrate. The method comprises the steps of providing a fluoropolymer, and dehydrofluorinating the fluoropolymer by a dehydrofluorination method that produces unsaturation of the fluoropolymer, but causes substantially no grafted substituent to be introduced to the fluoropolymer. The previously dehydrofluorinated fluoropolymer is then contacted to the hydrocarbon substrate. The dehydrofluorinated fluoropolymer is sufficiently dehydrofluorinated to increase bond strength between the dehydrofluorinated fluoropolymer and the hydrocarbon substrate, as compared to fluoropolymer that is not dehydrofluorinated.

The hydrocarbon substrate can preferably comprise a substantially non-fluorinated polyamide, polyurethane, polyimide, polyolefin, or carboxyl-, anhydride-, or imide-functional polyolefin. The hydrocarbon substrate is not required to contain adhesion-promoting compounds such as di-, or polyamine compounds. Still, it can also be desirable to include such di-, or polyamine compounds within the hydrocarbon substrate in order to further enhance the bond strength between the fluoropolymer and the hydrocarbon substrate.

Another aspect of the present invention relates to a multi-layer article that contains a dehydrofluorinated fluoropolymer in contact with a hydrocarbon substrate. The fluoropolymer contains carbon-carbon unsaturation, but substantially no grafted adhesion-promoting groups. Due to the unsaturation within the fluoropolymer, there is an improved bond strength between the fluoropolymer and the hydrocarbon substrate, as compared to a multi-layer article prepared from a non-dehydrofluorinated fluoropolymer.

DETAILED DESCRIPTION

Fluoropolymers useful in the present invention can be any of the fluoropolymers known to be useful in the fluoropolymer art, and that can undergo dehydrofluorination to produce a fluoropolymer having carbon-carbon unsaturation in the fluoropolymer. Fluoropolymers that have been found to be susceptible to dehydrofluorination include those containing a carbon-bonded fluorine atom adjacent to a carbon-bonded hydrogen atom, as represented by the following structural sequence:

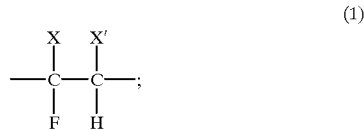

In formula 1, X and X' can each be independently a hydrogen atom or an alkyl group such as a fluoroalkyl group. However to facilitate dehydrofluorination, it is preferred that a carbon-bonded hydrogen atom adjacent to the carbon-bonded fluorine atom be to some degree acidic. This can be accomplished by providing that at least one of X or X' is an electron-withdrawing group such as fluorine, a fluorine-containing alkyl or alkoxy group (e.g., trifluoromethyl, pentafluoroethyl, etc.), a nitrile group, or any other suitable electron-withdrawing group. Preferably one or more of the X or X' groups, is perfluorinated, and if not perfluorinated, has fluorine atoms located as near as possible to the backbone of the fluoropolymer, e.g., any hydrogen atoms are attached to carbon atoms that are distant from the polymer backbone: —CF$_2$CF$_2$H, —CF$_2$CF$_2$CF$_2$H, etc.

Useful fluoropolymers can be prepared by polymerizing or copolymerizing olefinically unsaturated monomers. To produce a fluoropolymer having the structural sequence of formula 1, the monomer and/or comonomers must contain both carbon-bonded fluorine atoms and carbon-bonded hydrogen atoms. For example, useful fluoropolymers can be homopolymers prepared from unsaturated hydrofluorocarbon monomers, or, useful fluoropolymers can be copolymers derived from fully-fluorinated unsaturated monomers copolymerized with one or more hydrogen-containing unsaturated monomer—i.e., a hydrofluorocarbon monomer and/or a non-fluorinated monomer.

Examples of useful olefinically unsaturated monomers include hexafluoropropylene (HFP), tetrafluoroethylene (TFE), vinylidene fluoride (VDF), chlorotrifluoroethylene (CTFE), 2-chloropentafluoro-propene, perfluoroalkyl vinyl ethers, e.g. CF$_3$OCF=CF$_2$ or CF$_3$CF$_2$OCF=CF$_2$, 1-hydropentafluoropropene, 2-hydro-pentafluoropropene, dichlorodifluoroethylene, trifluoroethylene, 1,1-dichlorofluoroethylene, and perfluoro-1,3-dioxoles such as those described in U.S. Pat. No. 4,558,142 (Squire), and fluorine-free, olefinically unsaturated alkylene monomers such as ethylene, propylene, butylene, etc. Fluorine-containing di-olefins can also be useful, including di-olefins such as perfluorodiallylether and perfluoro-1,3-butadiene.

The olefinically unsaturated monomers used to produce the fluoropolymer may further be copolymerized with iodine- or bromine-containing cure-site monomers to prepare peroxide curable polymer. Suitable cure-site monomers include terminally unsaturated mono-olefins of 2 to 4 carbon atoms such as bromodifluoroethylene, bromotrifluoroethylene, iodotrifluoroethylene, and 4-bromo-3,3,4,4-tetrafluoro-butene-1.

The olefinically unsaturated monomers or comonomers can be polymerized to produce a fluoropolymer by methods known in the fluoropolymer art. In general, olefinically unsaturated fluorinated monomers can be polymerized, and optionally copolymerized with non-fluorinated olefin monomers in aqueous, colloidal dispersions. The dispersions typically contain a water-soluble initiator such as ammonium or alkali metal persulfates or alkali metal permanganates, which produce free radicals, and one or more emulsifiers such as the ammonium or alkali metal salts of perfluorooctanoic acid. See for example U.S. Pat. No. 4,335,238.

Useful fluoropolymers are also commercially available, for example from Dyneon LLC, St. Paul Minn., under the trade names THV 200, THV 230, THV 500, THV530, Fluore™ (HFP/VDF), Fluorel-II™ (TFE/PP/VDF), and Kel-F™ KF-800, fluoroelastomer; from Elf Atochem North America Inc., under the trade names Kynar™ 740, 2800, 9301; from Kureha Chemical Co. under the trade name KF polymer; from Daikin America, Inc. under the trade name NEOFLUORON VDF; from Central Glass under the trade name Cefral Soft™ G-150, and from Asahi Glass Co., Ltd., under the trade name AFLAS™ 200.

The fluoropolymer can be dehydrofluorinated by any method that will provide sufficient carbon-carbon unsaturation of the fluoropolymer to create increased bond strength between the fluoropolymer and a hydrocarbon substrate. Preferably, the dehydrofluorination process will not introduce into the fluoropolymer a significant amount of grafted substituents. By "a significant amount," it is meant, for instance, an amount greater than about 2 mole percent, based on the number of interpolymerized monomeric units comprising the dehydrofluorinated fluoropolymer. Preferably, fewer than about 1 mole percent adhesion-promoting groups are grafted onto the fluorinated polymer during dehydrofluorination, e.g., fewer than about 0.5, 0.2, or 0.1 mole percent, based on the total number of interpolymerized polymeric units comprising the dehydrofluorinated fluoropolymer. In the case of dehydrofluorinating bulk fluoropolymer, the introduction of less than a significant amount of grafted substituents onto the fluoropolymer will preferably not alter by a measurable amount the physical or mechanical properties of the fluoropolymer.

Many suitable dehydrofluorination methods are known in the fluoropolymer art. For example, dehydrofluorination of bulk fluoropolymer can be accomplished by solvent-based methods wherein a fluoropolymer is dissolved in a solution of organic solvent. A basic reagent is added to the solution to cause dehydrofluorination, optionally in the presence of a phase transfer catalyst. Typical solvents include tetrahydrofiran, methyl isobutyl ketone, methyl ethyl ketone, acetone, n,n-dimethyl formamide, dimethylacetamide, etc. See for example U.S. Pat. Nos. 3,507,844, 4,742,126, and U.S. Pat. No. 4,758,618. Alternatively, dehydrofluorination can be accomplished in a two phase solvent method wherein fluoropolymer is dissolved in an organic solvent, and this solvent phase is mixed with an aqueous phase containing an alkali metal hydroxide and a phase transfer catalyst. See U.S. Pat. No. 4,742,126. According to yet another method, fluoropolymers can be dehydrofluorinated by dry, bulk dehydrofluorination methods referred to in the art as "reactive extrusion methods." By these methods, dehydrofluorination is achieved by a dry basic process using, e.g., an extruder or a bowl mixer.

Dehydrofluorination of fluoropolymer within an aqueous fluoropolymer emulsion can be also accomplished under relatively mild conditions in a basic, aqueous medium containing substantially no organic solvent, and preferably in a 100 percent aqueous medium that contains no organic solvent. By this aqueous dehydrofluorination method, a basic compound can be added to a fluoropolymer emulsion that contains a fluoropolymer according to formula 1. The basic compound is added to the emulsion in an amount that does not disrupt the stability of the emulsion, and therefore does not cause coagulation of the fluoropolymer. As used within the present description, the term "coagulation" refers to the condition of fluoropolymer precipitation out of the emulsion. Then, the emulsion can be subjected to reaction conditions sufficient to allow the basic compound to react across the —CFX-CHX'— reaction site of the fluoropolymer, and to thereby remove a hydrogen and a fluorine atom from the fluoropolymer to produce an unsaturated —CX=CX'— sequence within the fluoropolymer. The aqueous dehydrofluorination reaction conditions (i.e., reaction time and temperature) can be any reaction time and any reaction temperature that allow the dehydrofluorination reaction to occur, and can depend on the particular fluoropolymer and base compounds chosen, as well as the desired degree of unsaturation of the resulting dehydrofluorinated fluoropolymer. In this aqueous dehydrofluorination method, the reaction temperature can be relatively mild, for instance in the range from about 40 to 100 degrees Celsius. The reaction time can be any useful reaction time, but can preferably be in the range from about 6 to 100 hours. Such an aqueous dehydrofluorination method is described in Assignee's copending U.S. Pat. Application having Attorney's Docket Number 52616USA7A, filed on even date herewith, and incorporated herein by reference.

The above-described dehydrofluorination methods relate to the dehydrofluorination of bulk fluoropolymer (e.g., fluoropolymer granules), or fluoropolymer emulsions. In these bulk and emulsion-type dehydrofluorination processes, the amount of dehydrofluorination of the fluoropolymer can preferably be in the range from about 0.02 mole percent to 20 mole percent, based on the number of interpolymerized monomeric units used to prepare the dehydrofluorinated fluoropolymer, with the range from about 0.2 mole percent to about 15 mole percent being particularly preferred. After or during dehydrofluorination of the fluoropolymer, the fluoropolymer can be formed by known methods into a film which can be used to construct into a multi-layer article.

In another embodiment of the invention, non-dehydrofluorinated fltoropolymer can be first formed into a film, followed by dehydrofluorination of the fluoropolymer film, or a portion thereof As an example, a surface of a fluoropolymer film can be dehydrofluorinated. Advantages of dehydrofluorinating only a surface of a fluoropolymer film include the advantage that the majority of the fluoropolymer, including other exposed surfaces, need not be dehydrofluorinated. Thus, the majority of the fluoropolymer film retains physical properties that are not compromised by unsaturation. This can result in increased resistance to chemical attack, and reduced potential for discoloration (e.g., yellowing) of the fluoropolymer film.

Dehydrofluorination of a fluoropolymer film surface can be accomplished by surface treatment of the fluoropolymer film with solutions of various basic compounds, optionally in the presence of a catalyst. Examples of suitable basic compounds include ethylamine, hydroxides such as potassium hydroxide (KOH), ammonium hydroxide ($NH_4OH$), sodium hydroxide (NaOH), lithium hydroxide (LiOH); carbonates such as potassium carbonate ($K_2CO_3$), sodium carbonate ($Na_2CO_3$), etc. Useful catalysts are known in the fluoropolymer art and include, for example, tetrabutylammonium bromide (TBAB), tetraalkyl phosphonium halides, alkylarylphosphonium halides, alkyl ammonium halides, and alkyl phosphonium halides.

The basic compound and optional catalyst can be dissolved or diluted in a solvent such as naphthalene, THF, water, etc., to produce a basic solution that can be applied to a surface of the fluoropolymer film to cause dehydrofluorination of the fluoropolymer film surface. The basic compound and optional catalyst can be present in the basic solution in any amount that is effective to cause dehydrofluorination of the fluoropolymer surface, as applied. As an example, NaOH can be dissolved in water to produce a basic solution containing from about 2 to 24 weight percent NaOH and a small amount of catalyst (e.g., 0.05 wt % TBAB). The basic solution can be applied to the fluoropolymer surface by any useful means, including manual or automated methods such as wiping, coating, or spraying the basic solution onto the fluoropolymer, or by submerging the fluoropolymer into the basic solution. Then, in an optional step, the basic solution can be rinsed from the fluoropolymer film using deionized water.

The hydrocarbon substrate can comprise any hydrocarbon material that, in the practice of the present invention, can exhibits improved adhesion to a dehydrofluorinated fluoropolymer than to a non-dehydrofluorinated fluoropolymer. Preferably, the hydrocarbon substrate is a substantially non-fluorinated polycarbonate, polyamide, polyurethane, polyimide, polyolefin, or carboxyl-, anhydride-, or imide-functional polyolefin, because hydrocarbon-based materials comprising these chemical components have been found to exhibit the most noticeable improvements in adhesion to a fluoropolymer upon dehydrofluorination of the fluoropolymer. The hydrocarbon material of the hydrocarbon substrate may contain fluorine, but if so, the hydrocarbon substrate preferably contains only a minor amount of fluorine, i.e., less than about 5 weight percent, more preferably less than about 1 weight percent fluorine.

Polyamides useful as the hydrocarbon substrate include those that are generally commercially available. For example polyamides such as any of the well-known nylons. Preferred polyamides include nylon 6, nylon 6,6, nylon 11, or nylon 12. It should be noted that the selection of a particular polyamide material should be based upon the desired physical properties and physical requirements of the resulting multi-layer article. For example, nylon 6 and nylon 6,6 offer higher heat resistance properties than nylon 11 or nylon 12, whereas nylon 11 and nylon 12 offer better chemical resistance properties. In addition, other nylon material such as nylon 6,12, nylon 6,9, nylon 4, nylon 4,2, nylon 4,6, nylon 7, and nylon 8 may also be used. Ring containing polyamides such as nylon 6,T and nylon 6,I, and polyether containing polyamides, such as Pebax™ polyamines, may also be used.

Polyurethanes that can be useful as the hydrocarbon substrate include aliphatic, cycloaliphatic, aromatic, and polycyclic polyurethanes. These polyurethanes are typically produced by reaction of a polyfunctional isocyanate with a polyol according to well known reaction mechanisms. Useful diisocyanates for employment in the production of a polyurethane include dicyclohexylmethane-4,4'-diisocyanate, isophorone diisocyanate, 1,6-hexamethylene diisocyanate, cyclohexyl dksocyanate, diphenylmethane diisocyanate. Combinations of one or more polyfunctional isocyanates may also be used. Useful polyols include polypentyleneadipate glycol, polytetramethylene ether glycol, polyethylene glycol, polycaprolactone diol, poly-1,2-butylene oxide glycol, and combinations thereof Chain extenders such as butanediol or hexanediol may optionally be included in the reaction. Commercially available urethane polymers useful in the practice of the present invention include PN-04 or 3429 from Morton International, Inc., Seabrook, N.H., and X-4107 from B.F. Goodrich Company, Cleveland, Ohio.

Polyimides useful as the hydrocarbon substrate include many polyimides that are known to be useful in combination with fluoropolymers to produce multi-layer articles. Such polyimides can be prepared by methods known in the polyimide art, and described, for example, in U.S. Pat. Nos. 3,592,714 and 5,106,673; and European Patent Application 0 185 590. Preferred polyimides are commercially available, for example from The Du Pont Co., under the trade name Kapton™, from Ube Ind. Inc., under the trade name Upilex™, and from Allied-Apical Co., under the trade name Apical™.

Polyolefin polymers found to be useful as the hydrocarbon substrate are generally homopolymers or copolymers of ethylene, propylene, acrylic monomers, or other ethylenically unsaturated monomers, for example, vinyl acetate. Such polymers and copolymers can be prepared by conventional free-radical polymerization of such ethylenically unsaturated monomers. The hydrocarbon substrate or copolymer can be in any of various states of crystallinity. The polymer may, for example, be a semi-crystalline high density polyethylene or may be an elastomeric copolymer of ethylene and propylene. Although not necessary to the performance of the hydrocarbon substrate within the present invention, carboxyl, anhydride, or imide functionalities may be incorporated into the polymer or copolymer by polymerizing or copolymerizing functional monomers, for example, acrylic acid or maleic anhydride, or by modifying a polymer after polymerization, for example by oxidation. The carboxyl-, anhydride-, or imide-functional polymers useful as the hydrocarbon substrate are generally commercially available. For example, acid modified ethylene vinyl acetates, acid modified ethylene acrylates, anhydride modified ethylene acrylates, anhydride modified ethylene vinyl acetates, anhydride modified polyethylenes, and anhydride modified polypropylenes are available from DuPont as Bynel™ coextrudable adhesive resins.

An advantage of the present invention is that an enhanced bond can be achieved between a hydrocarbon substrate and a fluoropolymer without the addition of adhesion-enhancing chemicals to the hydrocarbon substrate. Thus, there is no requirement that in addition to dehydrofluorination of the fluoropolymer, adhesion-promoting chemical compounds be added to the hydrocarbon substrate. Still, the optional use of adhesion-promoting chemicals within the hydrocarbon substrate can provide an even stronger adhesive bond between the fluoropolymer and the substrate. As an example, a hydrocarbon substrate may contain an aliphatic di-, or poly amine compound that will further increase the adhesive bond strength between the fluoropolymer and the hydrocarbon substrate. Preferred aliphatic di-, or polyamines include diamines or di-, or polyamines that comprise at least two primary amines, such as hexamethylene diamine, dodecanediamine, and 2,4,8,10-tetraoxaspiro[5,5]undecane-3,9-dipropanamine.

The optional aliphatic di-, or polyamine can be of any molecular weight that can be incorporated into the hydrocarbon substrate to result in an improvement in the adhesive bond strength between a fluoropolymer and the substrate. As an example, the aliphatic di-, or polyamine may have a weight average molecular weight of below 5,000, more preferably below 2,000, or 1,000, as measured by known gel permeation chromatography (GPC) methods.

The aliphatic di-, or polyamine can be dispersed throughout the hydrocarbon substrate, and can be present in any amount that will result in an increased adhesive bond strength between the fluoropolymer and the substrate. For instance, the optional aliphatic di-, or polyamine can be present in the substrate in an amount in the range from about 0.1 to 10 parts by weight aliphatic di-, or polyamine, based on 100 parts by weight substrate, with the range from about 0.5 to 3 parts by weight, based on 100 parts fluoropolymer, being preferred.

The dehydrofluorinated fluoropolymer and the hydrocarbon substrate can be brought together to form a multi-layer article. The method of preparing the multi-layer article can be any of a number of known methods such as lamination, heat lamination, and co-extrusion methods, etc. The chosen method can also depend on the method used to dehydrofluorinate the fluoropolymer. For instance, co-extrusion methods are often used in combination with reactive extrusion dehydrofluorination methods, and lamination methods are often used in combination with surface treatment dehydrofluorination methods.

Lamination and heat lamination methods are known in the fluoropolymer art, and generally involve placing a piece (e.g., sheet) of the fluoropolymer (in the practice of the present invention, dehydrofluorinated fluoropolymer) in contact with the hydrocarbon substrate, followed by the application of heat and optional pressure to the two contacted materials, to produce a multi-layer article. As described above, the fluoropolymer may have been dehydrofluorinated prior to or after being formed into the fluoropolymer sheet.

Coextrusion methods are also known in the fluoropolymer art, and generally involve the melting of polymeric materials (e.g., the fluoropolymer and polymeric hydrocarbon substrate materials) and the heated, pressurized extrusion of the melted polymeric materials through a single or multi-layer die, to produce a multi-layer article. See, e.g., U.S. Pat. No. 5,284,184, and European Patent Application 0 132 583. This can be accomplished optionally in combination with dehydrofluorination by reactive extrusion methods; i.e., a fluoropolymer can dehydrofluorinated be reactive extrusion, in line with a coextrusion process to prepare a multi-layer co-extruded article. Also optionally, the fluoropolymer can be processed (coextruded, laminated, etc.) in combination with not just a single other hydrocarbon substrate, but with one or more other polymeric layers such as hydrocarbon layers and/or fluoropolymer layers, or mixtures thereof, to produce a multi-layer article comprising three or more different layers.

The heat and pressure of the method (e.g., extrusion, lamination, etc.) by which the fluoropolymer and hydrocarbon layers are brought together may be adequate to provide sufficient adhesion between the layers. In some situations, however, it may be desirable to further enhance the adhesion between the layers by additional treatment of the resulting multi-layer article, for example, with supplemental exposure to heat, pressure, or both. One technique for adding supplemental heat and/or pressure to the multi-layer article is to extend the exposure of the multi-layer article to a heat when the multi-layer composition is prepared by extrusion or lamination. Or, extrusion or lamination may be accomplished at a temperature in excess of the temperature needed for merely processing the several multiple layers. Alternatively, the finished multi-layer article may be held at an elevated temperature for an extended period of time, for example by placing the multi-layer article in an elevated temperature environment after production, such as in an oven or a heated liquid bath. A combination of these methods may also be used.

The invention will now be described in terms of the following non-limiting examples. Articles prepared by methods of the present invention will be useful within applications that are apparent to those skilled in the art. Examples include applications where multi-layer films are desirously chemically inert, and can optionally be gas impermeable. Such applications include the use of multi-layer films as gas-impermeable films, layers, sheets, or hoses as used, for instance as a fuel line hose.

EXAMPLES

Example 1

Dehydrofluorinated Fluoropolymer Sample 1 (DHF Sample 1) was prepared according to the following solvent-type dehydrofluorination method. 110 g of THV 200 fluoroplastic powder from 3M Co. was dissolved in about 1.1 L of tetrahydrofuran (THF). Once the polymer was fully dissolved, 5.0 g (0.03 mol) of 1,8 diazobicyclo [5.4.0.] undec-7-ene (DBU) from Aldrich Chemical Co. was added to the solution. The solution was mixed for 16 hours at room temperature, during which time the reaction solution turned to a light yellow color. After this time, the polymer solution was precipitated into a 1:1 vol mixture of water and methanol. The dehydrofluorinated polymer was collected, dried and redissolved in THF. The polymer was then precipitated 2 more times in this fashion and dried.

Dehydrofluorinated Fluoropolymer Sample 2 was prepared as described for DHF Sample 1, except that 10.0 g (0.06mol) of DBU was added, and that during the reaction the solution turned a darker orange than DHF Sample 1.

$^{19}$F NMR spectroscopy was used to determined the percent dehydrofluorination of the Sample dehydrofluorinated fluoropolymers. The $^{19}$F NMR spectra consisted of new resonances at −56 and −62 ppm which correspond to unsaturated vinyl $CF_3$ units of the type —CF═C($CF_3$)—.

Dehydrofluorinated Fluoropolymer Samples 3 through 7 (DHF Samples 3–7) were prepared by an aqueous dehydrofluorination process as follows, starting with THV 230R fluoropolymer emulsion from 3M Co. For DHF Sample 3, 100 g of THV 230R fluoropolymer emulsion was mixed with 255 g of 0.2 M KOH solution (0.5 meq KOH/g-emulsion) in a 500 mL, one neck flask equipped with a magnetic stir bar. The flask was immersed in a constant temperature oil bath at 80° C. The extent of reaction was monitored by titration of the reaction emulsion with 0.1N HCl to determine the amount of unreacted base present, which was then related to the amount of base that had reacted with the fluoropolymer. The data for the reaction are shown in Table 1. The dehydrofluorinated fluoropolymer emulsion was coagulated by precipitating the fluoropolymer into a 20% solution of $MgCl_2$. The coagulated fluoropolymer was collected by filtration and washed with DI water (about 2 L). The dried polymer was then characterized by NMR and IR spectroscopies. The $^{19}$F NMR spectra included new resonances at −56 and −62 ppm, which correspond to unsaturated vinyl $CF_3$ units of the type —CF═C($CF_3$)—. The IR spectral data showed a new signal at 1723 $cm^{-1}$ which is consistent for a fluoroolefin. The intensity IR signal at 1723 $cm^{-1}$ was then compared to a C—C bond band at 824 $cm^{-1}$ and a ratio of these bands could then provide a relative comparison of the amount of dehydrofluorination as determined by the different analytical techniques. Similar methods were used to produce DHF Samples 4 through 7, except that the amount of base added was varied to provide from 0.4 meq KOH/g-emulsion (for DHF Sample 4) down to 0.1 meq KOH/g-emulsion (for DHF Sample 7), resulting in different amounts of dehydrofluorination within the dehydrofluorinated fluoropolymer Samples.

Dehydrofluorinated Fluoropolymer Samples 8–11 (DHF Samples 8–11) were prepared by the aqueous dehydrofluorination process used to prepare DHF Samples 3–7, except that the fluoropolymer emulsions were reacted with 0.4 meq KOH/g-emulsion at different temperatures to prepare dehydrofluorinated fluoropolymer having different amounts of dehydrofluorination. To prepare DHF Sample 8, 100 g of THV 230R fluoropolymer emulsion was mixed with 200 g of 0.2M KOH in a one neck flask. The flask was placed in a constant temperature oil bath at 40° C. for 4-days. The consumption of the base was monitored as a function of time by titration of the residual base with 0.1 N HCl. The reaction was stopped after the consumption of the base appeared to level off. The dehydrofluorinated fluoropolymer emulsion was coagulated, washed and characterized (via NMR and IR spectroscopies) as described for DHF Samples 3–7 except that the emulsions were coagulated with NaCl (aq) instead of $MgCl_2$ (aq). The experiment was repeated for reaction temperatures of 60°, 80°, 100° C., to produce DHF Samples 9, 10, and 11, respectively.

Dehydrofluorinated Fluoropolymer Samples 12–15 (DHF Samples 12–15), were prepared according to the aqueous dehydrofluorination method used to prepare DHF Samples 8–11, except the fluoropolymer emulsion used was THV 530 fluoropolymer emulsion from 3M. Again, the fluoropolymer emulsion was reacted with 0.4 meq KOH/g-emulsion at different temperatures to produce DHF Samples having different degrees of unsaturation. To prepare DHF Sample 12, 100 g of THV 530 fluoropolymer emulsion was mixed with 400 g of 0.1 M KOH in a flask. The flask was placed in a constant temperature oil bath at 40° C. for 4 days. The total consumption of the base was determined by titration of the residual base with 0.1N HCl. The dehydrofluorinated fluoropolymer emulsion was coagulated and washed as described for Polymers 8–11. The polymer was characterized by IR spectroscopy as described previously. The experiment was repeated for reaction temperatures of 60°, 80°, 100° C. for the times indicated. Higher temperatures produced the described level of dehydrofluorination in significantly less time.

Dehydrofluorinated fluoropolymer Samples 17 and 18 (DHF Samples 17 add 18) were prepared by the same method as used to prepare DHF Samples 5 and 7.

Adhesion Testing

Fluoropolymer film samples of the above-described dehydrofluorinated fluoropolymer Samples were prepared as follows: dried fluoropolymer was allowed to melt between silicone release liners for 3 min at atmospheric pressure. The films were then pressed for about 30 sec at 1000 psi and immediately transferred to a room temperature press to cool. The layer thickness was about 8 mils (0.2 mm). The layers were then placed between two films of non-fluorinated hydrocarbon substrates (either Nylon-12 or polyurethane, as reported in Table 1). At the top ⅛ to ¼ of an inch of the laminate a small piece Teflon™ adhesive tape was placed between the layers to prevent the entire laminate samples from adhering together and thus T-peel samples could be prepared. The laminate composites were then pressed at 190° C. for <30 sec at 2500 psi, and allowed to cool to room temperature in a press. Adhesion strength data were obtained from a 180° T-peel test using an Instron mechanical tester with a 200 lb load cell. The adhesive strength was determined as a function of crosshead displacement. The rate of the test was 102 mm/min (4.1 in/min). The data shown in Table 1 represent the averages of at least samples tested.

Comparative Examples 1 through 3 were prepared from non-dehydrofluorinated fluoropolymers according to Table 1, and were laminated to the substrates reported in Table 1 by similar methods.

TABLE 1

| Sample | Fluorinated polymer | Substrate | mole % dehydrofluorination (measured by NMR) | mole % dehydrofluorination (measured by IR) | Adhesion (kg/2.5 cm) |
|---|---|---|---|---|---|
| 1 | THV-230 | Nylon-12 | 18 | | 11.3 |
| 2 | " | " | 30 | | 12.2 |
| 3 | " | " | 1.26 | 0.33 | 6.8 |
| 4 | " | " | 1.22 | 0.35 | 7.7 |
| 5 | " | " | 1.32 | 0.39 | 3.6 |
| 6 | " | " | 1.19 | 0.27 | 4.5 |
| 7 | " | " | 0.87 | 0.18 | 3.6 |
| 8 | " | " | 0.54 | 0.15 | 10.4 |
| 9 | " | " | 0.88 | 0.18 | 10.9 |
| 10 | " | " | 1.4 | 0.23 | 11.3 |
| 11 | " | " | 1.6 | 0.28 | 12.2 |
| 12 | THV-530 | " | | 0.13 | 4.1 |
| 13 | " | " | | 0.15 | 3.6 |
| 14 | " | " | | 0.19 | 2.3 |
| 15 | " | " | | 0.29 | 1.4 |
| 17 | THV-230 | Polyurethane | 1.32 | | 2.7 |
| 18 | " | Polyurethane | 0.87 | | 3.2 |
| Comp 1 | " | Nylon-12 | | | 0 |
| Comp 2 | " | Polyurethane | | | 0 |
| Comp 3 | THV-530 | Nylon-12 | | | 0 |

Nylon-12 was obtained from Huls Aktiengesellschaft Vestamid ™ L2101F. Polyurethane was obtained from Morton International as L-424.167.

The data of Table 1 show that dehydrofluorinated fluoropolymers exhibit greatly improved adhesion to non-fluorinated substrates when compared to the adhesion between untreated (i.e., non-dehydrofluorinated) fluoropolymers and non-fluorinated substrates. Further, adhesion is improved when dehydrofluorination is accomplished by various methods.

Example 2

Dehydrofluorinated Fluoropolymer Samples 19 to 23 (DHF 19–23) were prepared to test their adhesion properties to a hydrocarbon substrate. Dehydrofluorination was accomplished in a dry, bulk process as follows: 34.965 g of THV 500 fluoropolymer (available from Dyneon), 1.85 g of calcium hydroxide, and 0.185 g of catalyst were mixed and reacted at 230° C. for 10 minutes at 75 revolutions per minute (rpm) in a Plasticorder internal bowl mixer equipped with roller blades, from C.W.Brabender Instruments, Inc. The catalysts used were commercially available catalysts, and are identified in Table 2.

TABLE 2

| Sample | Catalyst |
|---|---|
| 19 | 1,8-diazabicyclo[5,4,0]-7-undecenium phenolic acid |
| 20 | 1,8-diazabicyclo[5,4,0]-7-undecenium p-toluene sulfonic acid |
| 21 | tetrabutylammonium hydrogen sulfate (TBAHS) |
| 22 | tetrabutylphosphonium bromide |
| 23 | tetrabutylphosphonium chloride |

The dehydrofluorinated bulk THV 500 fluoroplastic was pressed at 230° C. for about 30 seconds to form a sheet. After cooling to room temperature, the sheet of dehydrofluorinated THV 500 fluoroplastic was laminated to a sheet of nylon 12 (Vestamid TM L2101F, Huls Aktiengesellschaft) using a Model 20–122 TM 2WCB, laminating apparatus from Wabash Metal Products, and according to the three different lamination conditions (i.e., times and temperatures) reported in Table 3. Prior to the actual lamination, a narrow strip of PTFE (Polytetrafluoroethylene) film was inserted between the two sheets, at an edge, to create two tabs for insertion into each jaw of an adhesion testing apparatus.

After cooling to room temperature, the laminated sheets were cut to a width of about ½ to 1 inch (1.27 to 2.54 cm). The adhesion between the two layers was evaluated in accordance with ASTM D-1876, commonly known as a "T-peel" test, using a Sintech Tester 20, from MTS Systems Corporation. Cross-head speed was 4 in./min. (about 10 cm/min). The results reported are the average of at least three specimens, and are given in Table 3. A control sample (Comp 5) of pure (non-dehydrofluorinated) THV 500 fluoroplastic and a sheet of Nylon 12 were laminated according to the above procedure.

A sheet of non-dehydrofluorinated THV-500 fluoroplastic was laminated to a sheet of nylon 12, according to the procedures of Samples 19 to 23.

TABLE 3

| | | adhesion (kg/2.5 cm) at 3 different lamination conditions | | |
|---|---|---|---|---|
| Sample | C=C ratio by IR | 180° C./3 min. | 230° C./1 min. | 230° C./3 min. |
| 19 | — | 6.4 | 9.1 | 9.1 |
| 20 | 1.17 | 5.0 | 9.1 | 11.3 |
| 21 | — | <0.5 | <0.5 | 1.4 |
| 22 | — | 4.1 | 7.3 | 7.7 |
| 23 | — | 1.8 | 5.9 | 7.3 |
| Comp 5 | 0.01 | 0 | 0 | 0 |

The data of Table 3 show that fluoropolymers dehydrofluorinated by dry, bulk methods, using various catalysts, exhibit improved adhesion to a hydrocarbon substrate over the control sample that had not been dehydrofluorinated.

Dehydrofluorinated fluoropolymer Samples 24 and 25 were prepared by a method similar to the preparation of Samples 19 to 23, except that the ratio of THV 500/Ca(OH)$_2$/tetrabutylammonium hydrogen sulfate catalyst was changed as follows: for Samples 21, 24, and 25, the THV500/Ca (OH)$_2$/TBAHS ratios were, respectively, 94.5/5/0.5, 94/5/1, and 88/10/2. Adhesive bond strength of these samples was tested according to the same procedure as was used to test Samples 19 to 23. Adhesion test results are reported in Table 4.

TABLE 4

| Sample | C=C ratio by IR | Adhesion (kg/2.5 cm) at different lamination conditions | | |
|---|---|---|---|---|
| | | 180° C./3 min. | 230° C./1 min. | 230° C./3 min. |
| 21 | 1.17 | <0.5 | <0.5 | 1.4 |
| 24 | — | <0.5 | 1.4 | 3.6 |
| 25 | — | <0.5 | 2.3 | 4.1 |

The data of Table 4 show that fluoropolymer that is dehydrofluorinated by a bulk method, and using different amounts of base and/or catalyst, can exhibit different increases in adhesive bond strength to a hydrocarbon substrate.

Example 3

Dehydrofluorinated fluoropolymer Samples 26 to 32 were prepared to test adhesive strength to various hydrocarbon substrates. The fluoropolymer sheets were prepared according to the same procedure as used for Samples 19 to 23, except that the fluoropolymer was THV 200 fluoroplastic (from Dyneon), and the catalyst used was 1,8-diazabicyclo [5,4,0]-7-undecenium p-toluene sulfonic acid (San-Apco Co.). The fluoropolymer Samples had a C=C mole percent of 10.7 as measured by NMR, and a C=C ratio of 1.31 as measured by FT-IR. After cooling to roomtemperature, sheets of dehydrofluorinated THV 200 were laminated to a number of different hydrofluorocarbon substrates. Lamination was accomplished using a hot press (Model 20–122 TM 2WCB, Wabash Metal Products) at 230° C. for 3 minutes. The samples were tested for adhesion as described for Samples 19 to 23.

Samples 33 to 39 were prepared in the same manner as Samples 26 to 32, except that 1,8-Diazabicyclo[5,4,0]undec-7-ene (DBU, Aldrich Chemical Company) was used as a catalyst during the dehydrofluorination of THV 200.
Comparisons 6 to 12
Sheets of pure (non-dehydrofluorinated) THV 200 fluoroplastic were prepared and laminated to a variety of substrates according to the same procedures as used in Samples 26 to 32
Sample 40 to 46
THV 500 fluoroplastic was used instead of THV 200 fluoroplastic in Samples 26 to 32 to make dehydrofluorinated THV 500 fluoroplastic. Other conditons were the same as in Samples 26 to 32.
Comparisons 13 to 19
Sheets of pure (non-dehydrofluorinated) THV 500 fluoroplastic were prepared and laminated to a variety of substrates according to the same procedures as used in Samples 26 to 32.

TABLE 5

| Sample | Fluoropolymer | Substrate | Peel Strength (kg/2.5 cm) |
|---|---|---|---|
| 28 | dehydrofluorinated THV200 | PC | 1.4 |
| 29 | ↓ | PI | 10.0 |
| 30 | ↓ | PET | 3.2 |
| 31 | ↓ | PU | 4.1 |
| 32 | ↓ | PU | 6.4 |
| 35 | ↓ | PC | 0.5 |
| 36 | ↓ | PI | 11.3 |
| 37 | ↓ | PET | 1.4 |
| 38 | ↓ | PU | 1.4 |
| 39 | ↓ | PU | 2.3 |
| Comp 8 | THV 200 | PC | 0 |
| Comp 9 | ↓ | PI | 0 |
| Comp 10 | ↓ | PET | 0 |
| Comp 11 | ↓ | PU | 0 |
| Comp 12 | ↓ | PU | 0 |
| 42 | dehydrofluorinated THV 500 | PC | 0 |
| 43 | ↓ | PI | |
| 44 | ↓ | PET | 0 |
| 45 | ↓ | PU | 0 |
| 46 | ↓ | PU | 2.3 |
| Comp 15 | THV 500 | PC | 0 |
| Comp 16 | ↓ | PI | 0 |
| Comp 17 | ↓ | PET | 0 |
| Comp 18 | ↓ | PU | 0 |
| Comp 19 | ↓ | PU | 0 |

PC; polycarbonate, Ave. Mw. = 64,000, Aldrich Chemical Company, Inc.
PI; polyimide film, Apical ®, 500AV, 5 mils, Allied-Apical Company
PET; polyester film, Scotchpar ®, FE40515, 3.88 mils, 3M
PU; thermoplastic polyurethane, Estane ®, Type 58133-025, The BF Goodrich Company
PU; thermoplastic polyurethane, Morthane ®, L429.71, Morton International, Inc.

According to the data of Table 5, non-dehydrofluorinated THV 200 fluoroplastic and THV 500 fluoroplastic showed poor adhesion to various substrates, while dehydrofluorinated THV 200 fluoroplastic and THV 500 fluoroplastic showed good adhesion.

Example 4

8 mil thick THV 500 fluoropolymer films were dehydrofluorinated by surface treating the fluoropolymer film with basic solutions and a Dynamil Series VRP 70 washing station (available from Western Technology Associates Anaheim Calif.). Each fluoropolymer film was treated for 60 seconds at 115 degrees F. using the basic solution reported in table 5. The sample was then rinsed using deionized water at ambient temperature for about 60 seconds. After dehydrofluorination of the fluoropolymer film surface, a polyurethane film was laminated to the dehydrofluorinated fluoropolymer surface at 300° F. for about 15 minutes.

The adhesion between the surface dehydrofluorinated fluoropolymer laminated to polyurethane was tested according to the following method. Double face tape was applied to the metal sliding table of an I-mass testing machine. The polyurethane side of the bilayer film was applied to the double side film, and the fluoropolymer layer was peeled from the polyurethane layer at an angle of approximately 180 degrees. The peel force (in newtons per 100 mm) at a peel rate of 30.5 cm per minute are reported in Table 6 as an average peel force for a 10 second pull.

TABLE 6

| Sample | Basic solution | 180 degree peel test (N/100 mm) |
|---|---|---|
| 48 | 5 wt % NaOH/0.005 wt % TBAB | 154.7 |
| 49 | 5 wt % NaOH/0.1 wt% | 198.0 |
| Comp 20 | none | 3.8 |

The data of Table 6 show that fluoropolymer that is dehydrofluorinated using a surface treatment method exhibit greater adhesive bond strength to a hydrocarbon substrate than does a similar fluoropolymer than has not been dehydrofluorinated.

Example 5

100 parts by weight of FX11705 Fluorel II™ fluoroelastomer (commercially available from 3M Company) were melted in a Brabender mixer at 150° C., and 5 by weight parts KOH were introduced. The mixture was reacted in the melt while being mixed at 50 rpm for 30 min. The resultant dehydrofluorinated polymer, a dark brownish-black elastomer, was hot pressed between PET-lined metal sheets at 177° C. for 1 min at 1000 psi to yield a film of approximately 80 mil thickness. Composite laminates were constructed by placing the dehydrofluorinated fluoropolymer film between two Nylon 12 films (approx. 20 mil each), with 0.5–1.0 inch length release tabs at one end between the dehydrofluorinated fluoropolymer and the Nylon 12 films, and hot pressing these layers between PET-lined metal sheets at 177° C. for 3 min at 100 psi. The laminates were cooled layed flat to prevent curling, then die cut to 1×7 inch dimensions.

Peel strength values for these laminates were measured as follows: the release tabs were removed and the Nylon 12 layers were each clamped into a jaw of an Instron testing apparatus, set with a 1 inch overall jaw gap. 180° peel values were measured at a rate of 4.1 in/min. This dehydrofluorinated fluoropolymer afforded peel adhesion values on average of 20–22 lb/inch. FTIR microscopy analysis as described above yielded a ratio of the 1723 $cm^{-1}$ dehydrofluorinated band to an absorption band for the VF2 portion of the Fluorel II™ at 890 $cm^{-1}$ equal to 0.027. As a comparative example, FTIR analysis of the starting Fluorel II™ yielded a 1723 $cm^{-1}$/890 $cm^{-1}$ ratio of 0.0005, and peel adhesion values on average of 8–14 lb/inch.

What is claimed is:

1. A method of increasing the bond strength between a fluoropolymer and a substrate, the method comprising the steps of:
   providing a fluoropolymer;
   dehydrofluorinating the fluoropolymer by a method that produces unsaturation of the fluoropolymer, while resulting in substantially no adhesion-promoting groups being grafted onto the fluoropolymer; and
   directly contacting the dehydrofluorinated fluoropolymer to the hydrocarbon without the application of an adhesion-enhancing chemical to either the surface of the substrate or the surface of the dehydrofluorinated fluoropolymer, wherein the dehydrofluorinated fluoropolymer is sufficiently dehydrofluorinated to increase the bond strength between the substrate and the fluoropolymer, as compared to a fluoropolymer that is not dehydrofluorinated.

2. The method of claim 1, wherein the fluoropolymer is comprised of interpolymerized units derived from one or more of vinylidene fluoride, hexafluoropropylene, tetrafluoroethylene, and chlorotrifluoroethylene.

3. The method of claim 2, wherein the fluoropolymer is comprised of interpolymerized units derived from monomers further including one or more of ethylene, propylene, or butylene.

4. The method of claim 1, wherein the fluoropolymer is comprised of interpolymerized units derived from monomers consisting essentially of tetrafluoroethylene, polypropylene, and vinylidene fluoride.

5. The method of claim 1, wherein the method comprises the steps of dehydrofluorinating the fluoropolymer, and then forming the dehydrofluorinated fluoropolymer into a fluoropolymer film.

6. The method of claim 1, wherein the method comprises the steps of forming the fluoropolymer into a fluoropolymer film, followed by a dehydrofluorination step wherein a surface of the fluoropolymer film is dehydrofluorinated.

7. The method of claim 6, wherein during the dehydrofluorination step, fewer than 0.5 mole percent adhesion-promoting groups are grafted onto the fluoropolymer, based on the total number of interpolymerized monomeric units used to produce the dehydrofluorinated fluoropolymer.

8. The method of claim 1, wherein the dehydrofluorination step produces a fluoropolymer having from 0.2 to 20 mole percent dehydrofluorination, based on the total number of interpolymerized monomeric units used to produce the dehydrofluorinated fluoropolymer.

9. The method of claim 1, wherein the dehydrofluorination step produces a fluoropolymer having from 0.2 to 15 mole percent dehydrofluorination, based on the total number of interpolymerized monomeric units used to produce the dehydrofluorinated fluoropolymer.

10. The method of claim 1, wherein during the dehydrofluorination step, less than 2 mole percent adhesion-promoting groups are grafted onto the fluoropolymer, based on the total number of interpolymerized monomeric units used to produce the dehydrofluorinated fluoropolymer.

11. The method of claim 1, wherein the substrate contains no acrylate or methacrylate, and comprises at least one material selected from the group consisting of a polyamide, a polyurethane, a polyimide, a polyolefin, and a carboxyl-, anhydride-, or imide-functional polyolefin.

12. The method of claim 1, wherein during the contacting step, the dehydrofluorinated fluoropolymer is contacted with the substrate by a lamination process.

13. The method of claim 1, wherein a surface of the fluoropolymer is contacted with a second material to produce a multi-layer article comprising three or more layers.

14. The method of claim 13, wherein the second material comprises a polymeric material chosen from the group consisting of a hydrocarbon, a fluorocarbon, and mixtures thereof.

15. The method of claim 1, wherein during the contacting step, the dehydrofluorinated fluoropolymer is contacted with the substrate by a multi-layer extrusion process.

16. The method of claim 15, wherein the multi-layer extrusion process is a multi-layer extrusion process producing a multi-layer article comprising three or more layers.

17. The method of claim 1 wherein the substrate is a polyolefin.

18. The method of claim 1 wherein the substrate is a polyimide.

19. A multi-layer article comprising a substrate and a dehydrofluorinated fluoropolymer, wherein the dehydrofluorinated fluoropolymer contains substantially no grafted adhesion-promoting groups, and the dehydrofluorinated fluoropolymer contains sufficient carbon-carbon unsaturation to increase the adhesion between the dehydrofluorinated fluoropolymer and the substrate.

20. The multi-layer article of claim 19, wherein the fluoropolymer is comprised of interpolymerized units derived from one or more of vinylidene fluoride, hexafluoropropylene, tetrafluoroethylene, or chlorotrifluoroethylene.

21. The multi-layer article of claim 20, wherein the fluoropolymer is comprised of interpolymerized units derived from monomers further including one or more of ethylene, propylene, or butylene.

22. The multi-layer article of claim 19, wherein the fluoropolymer is comprised of interpolymerized units derived from monomers consisting essentially of tetrafluoroethylene, polypropylene, and vinylidene fluoride.

23. The multi-layer article of claim 19, wherein the fluoropolymer contains from about 0.2 to 20 mole percent dehydrofluorination, based on the total amount of interpolymerized monomeric units used to produce the dehydrofluorinated fluoropolymer.

24. The multi-layer article of claim 19, wherein the fluoropolymer contains from about 0.2 to 15 mole percent dehydrofluorination, based on the total number of interpolymerized monomeric units used to produce the dehydrofluorinated fluoropolymer.

25. The multi-layer article of claim, 19, wherein the fluoropolymer contains fewer than 2 mole percent grafted adhesion-promoting groups, based on the total number of interpolymerized monomeric units used to produce the dehydrofluorinated fluoropolymer.

26. The multi-layer article of claim 19, wherein the fluoropolymer contains fewer than 0.5 percent grafted adhesion-promoting groups, based on the total number of interpolymerized monomeric units used to produce the dehydrofluorinated fluoropolymer.

27. The multi-layer article of claim 19, wherein the substrate contains no acrylate or methacrylate, and comprises at least one material chosen from of the group consisting of a polyamide, a polyurethane, a polyimide, a polyolefin, and a carboxyl-, anhydride-, or imide-functional polyolefin.

28. The article of claim 19 wherein the substrate is a polyolefin.

29. The article of claim 19 wherein the substrate is a polyimide.

30. A multi-layer article comprising a substrate and a dehydrofluorinated fluoropolymer, wherein the dehydrofluorinated polymer contains substantially no grafted adhesion-promoting groups, and the dehydrofluorinated fluoropolymer contains sufficient carbon-carbon unsaturation to increase the adhesion between the dehydrofluorinated fluoropolymer and the substrate, and further, wherein the dehydrofluorinated fluoropolymer directly contacts the substrate without an adhesion-enhancing chemical located between the dehydrofluorinated fluoropolymer and the substrate.

31. The multi-layer article of claim 30, wherein the substrate contains no acrylate or methacrylate, and comprises at least one material chosen from of the group consisting of a polyamide, a polyurethane, a polyimide, a polyolefin, and a carboxyl-, anhydride-, or imide-functional polyolefin.

32. The multi-layer article of claim 30 wherein the substrate is a polyolefin.

33. The multi-layer article of claim 30 wherein the substrate is a polyimide.

* * * * *

UNITED STATES PATENT AND TRADEMARK OFFICE
CERTIFICATE OF CORRECTION

PATENT NO.: 6,080,487
DATED: June 27, 2000
INVENTOR(S): William D. Coggio, Timothy M. Dietz, Daniel R. Fronek, Tatsuo Fukushi, Constance J. Nelson, Douglas S. Parker, Trang D. Pham, Keizo Yamanaka It is certified that error appears in the above-identified patent and that said Letters Patent is hereby corrected as shown below:

Col. 4, line 21; "Fluore™" should be -- Fluorel™ --.

Col. 4, line 56; "tetrahydrofiran" should be -- tetrahydrofuran --.

Col. 5, line 51; "fltoropolymer" should be -- fluoropolymer --.

Col. 6, line 67; "dksocyanate" should be -- diisocyanate --.

Col. 14, Table 5-continued, line 11, Sample 43 under column for
        Peel Strength(kg/2.5cm); Please insert -- 2.7 --.

Claim 1, Column 15, line 42; "hydrocarbon" should be -- substrate --.

Signed and Sealed this

Seventeenth Day of April, 2001

*Attest:*

NICHOLAS P. GODICI

*Attesting Officer*   *Acting Director of the United States Patent and Trademark Office*